(12) United States Patent
Rieger et al.

(10) Patent No.: US 7,789,926 B2
(45) Date of Patent: Sep. 7, 2010

(54) AXIAL FLOW FILTER ELEMENT

(75) Inventors: Mario Rieger, Freiberg (DE); Werner Blossey, Benningen (DE); Lorenz Eilert, Braunschweig (DE)

(73) Assignee: Mann + Hummel GmbH, Ludwigsburg (DE)

( * ) Notice: Subject to any disclaimer, the term of this patent is extended or adjusted under 35 U.S.C. 154(b) by 584 days.

(21) Appl. No.: 11/754,608

(22) Filed: May 29, 2007

(65) Prior Publication Data
US 2007/0271885 A1  Nov. 29, 2007

(30) Foreign Application Priority Data
May 29, 2006  (DE) .................... 10 2006 025 232

(51) Int. Cl.
*B01D 59/50*  (2006.01)
(52) U.S. Cl. .................... 55/484; 55/482; 55/495; 55/498; 55/501; 55/502; 55/503; 210/317
(58) Field of Classification Search ............ 55/482–519
See application file for complete search history.

(56) References Cited

U.S. PATENT DOCUMENTS

| | | | | |
|---|---|---|---|---|
| 2,055,774 A | * | 9/1936 | Ray | 96/129 |
| 2,581,949 A | * | 1/1952 | Gerber | 96/419 |
| 2,582,219 A | * | 1/1952 | Ardito et al. | 55/373 |
| 2,780,828 A | * | 2/1957 | Brace | 15/351 |
| 2,853,153 A | * | 9/1958 | Sexton | 96/31 |
| 3,393,498 A | * | 7/1968 | Schoen | 55/493 |
| 4,217,122 A | * | 8/1980 | Shuler | 55/480 |
| 4,264,345 A | * | 4/1981 | Miller | 55/341.1 |
| 4,266,956 A | * | 5/1981 | Revell | 55/478 |
| 4,322,231 A | * | 3/1982 | Hilzendeger et al. | 55/357 |
| 4,334,900 A | * | 6/1982 | Neumann | 55/350.1 |
| 4,410,427 A | | 10/1983 | Wydeven | |
| 4,521,234 A | * | 6/1985 | Peebles et al. | 55/481 |
| 4,632,681 A | | 12/1986 | Brunner | |
| 5,447,544 A | | 9/1995 | Birdwell | |
| 5,470,364 A | * | 11/1995 | Adiletta | 55/484 |
| 5,792,247 A | | 8/1998 | Gillingham et al. | |
| 6,511,599 B2 | * | 1/2003 | Jaroszczyk et al. | 210/493.5 |
| 6,517,598 B2 | * | 2/2003 | Anderson et al. | 55/498 |
| 6,530,969 B2 | * | 3/2003 | Gieseke et al. | 55/330 |
| 6,773,479 B2 | * | 8/2004 | Debenedetti et al. | 55/482 |
| 7,261,756 B2 | * | 8/2007 | Merritt | 55/482 |

(Continued)

FOREIGN PATENT DOCUMENTS

DE  32 49 151 T1  1/1984

OTHER PUBLICATIONS

European Search Report dated Sep. 4, 2007 with English translation of relevant portion (Seven (7) pages).

*Primary Examiner*—Jason M Greene
*Assistant Examiner*—Dung Bui

(57) ABSTRACT

In a filter housing (100) for at least one axial flow filter element (70) capable of receiving axial flow between its end faces and having at least one continuous sealing collar on its outer circumference which can be pressed against a sealing flange (17) on the housing, a plurality of filter elements (70) can be inserted side by side into cutouts (19) of a common clamping frame element (30). Each of the sealing collars rests on the clamping frame element (30) which is plane parallel to the at least one sealing flange (17) and displaceable toward the sealing flange (17) by a clamping device (50).

11 Claims, 6 Drawing Sheets

U.S. PATENT DOCUMENTS

| | | | |
|---|---|---|---|
| 7,264,656 B2 * | 9/2007 | Kosmider et al. | 95/273 |
| 7,318,851 B2 * | 1/2008 | Brown et al. | 55/498 |
| 7,396,375 B2 * | 7/2008 | Nepsund et al. | 55/481 |
| 2004/0134353 A1 | 7/2004 | Gillingham et al. | |
| 2006/0070363 A1 * | 4/2006 | Jackson | 55/482 |
| 2006/0201118 A1 * | 9/2006 | Dudash et al. | 55/385.1 |
| 2008/0066435 A1 * | 3/2008 | Engel et al. | 55/492 |

\* cited by examiner

AXIAL FLOW FILTER ELEMENT

BACKGROUND OF THE INVENTION

The present invention relates to a filter housing for At least one axial flow filter element through which fluid to be filtered flows axially between its axial end faces and which has at least one continuous sealing collar on its outer circumference which can be pressed against a sealing flange on the housing.

German Patent Publication No. DE 32 49 151 C2 discloses an axial flow filter element. The compact filter element disclosed in that document comprises a corrugated and a smooth filter paper. The filter papers are bonded together and then wrapped together to form a filter element of the desired size. Bonding is effected by applying bands of adhesive in the margin such that interspaces between the corrugated and the smooth layer are alternately closed at the two end faces to prevent direct flow through the channels formed between the filter papers. An air stream flowing from the unfiltered air side to the filtered air side flows initially only into a dead-end channel, then through the filter paper and out of a dead-end channel on the other side. Compared to conventional pleated filters, these compact air filters have the advantage of offering either a larger filter surface for the same overall size or the same filter surface for a smaller overall size. The wrapped filter core is formed in such a way that the air can flow only through the filter paper.

In these and other compact air filter elements the flow is axial from one end face to the other. For flawless functioning, it is essential that the compact air filter element is hermetically sealed along its outer circumference in relation to the filter housing. To this end, a sealing collar is circumferentially formed, which must be placed against a corresponding locating shoulder in the filter housing and then pressed against this shoulder.

If the filter surface is to be increased, e.g., to lower the flow resistance, the wrapping diameter of the filter element and thus the filter housing dimensions also increase. There are usually limits to the expansion of the filter housing, however, because of the available installation space. As an alternative, a plurality of small filters with their own filter housings may be operated in parallel, but this is expensive, takes up installation space because of the additionally required inlet and outlet lines and has the result that for servicing the connections on several filter housings must be released, each housing must be opened, the filter elements must be replaced and the connections subsequently reestablished, so that any filter replacement is very labor intensive.

SUMMARY OF THE INVENTION

It is therefore an object of the invention to provide an improved arrangement of a plurality of axial flow filter elements.

Another object of the invention is to provide an arrangement of a plurality of axial flow filter elements that saves space and is easy to service.

These and other objects are achieved in accordance with the present invention by providing a filter housing for at least one axial flow filter element through which fluid to be filtered flows axially between inlet and outlet axial end faces and having at least one continuous sealing collar around its outer circumference which can be pressed against a sealing flange on the housing, wherein a plurality of filter elements can be inserted side by side into cutouts of a common clamping frame element, wherein each of the sealing collars rests on the clamping frame element, and wherein the clamping frame element is plane parallel to the at least one sealing flange and can be displaced by a clamping device toward the sealing flange.

An advantage of the invention is that a plurality of filter elements can be arranged in a housing with only a single connecting line. A common sealing unit is provided for the filter elements, which saves space. The common clamping frame element makes it possible to use a common clamping device to clamp, or subsequently loosen, all the filter elements inserted into the housing; an individual element cannot be forgotten. This enables rapid mounting or removal of the filter elements. It also has the advantage that a central clamping device prevents tilting on the sealing collars if the central clamping devices are centrally placed between the filter elements.

For servicing, the housing is opened, the clamping frame loosened and then pulled out of the housing with all the inserted filter elements simultaneously. The filter elements are then removed from the clamping frame and replaced with new elements. The clamping frame and the filter elements are then jointly reinserted into the housing and, with the aid of the clamping device, are moved toward the sealing flange on the housing, where the sealing collar provided on each of the filter elements is pressed onto the sealing flange.

The housing may be constructed to have a parting plane, which does not have to coincide with the press-on plane of the sealing collar but can be oriented perpendicularly thereto.

The housing can moreover be configured, for example, to comprise a housing pan which tapers to a flow opening in a funnel region at each of two opposite ends and is open on one side for the removal of the filter element in a central area between the funnel regions and closable by a cover. As a result, the filter housing can remain installed during servicing and the air lines connected to the fittings of the housing need not be released, so that a significant error source during servicing work is eliminated. Especially when filter housings are large, e.g., those used in construction machinery, the labor savings are substantial if only a single cover needs to be removed from the housing pan of the filter housing and the greater part of the housing can remain installed.

A separate contour can be formed as a sealing flange for each of the filter elements. It is also possible to form a common sealing flange having as many cutouts as there are sealing elements and offering a smooth contact surface around each of these cutouts, against which the sealing collar provided on each filter element can be pressed.

In an embodiment with two filter elements, the clamping device is preferably arranged between the two filter elements and pushes the common clamping frame of the filter elements forward from this position.

To minimize the height of the construction it is provided to insert filter elements with an oval or oblong cross section into a goggle-shaped clamping frame element. The filter elements are in particular arranged side by side so that their longitudinal axes are approximately aligned. This principle may also be extended to constructions with three or four filter elements.

In the simplest case, the clamping device is formed by a plurality of individually actuatable clamping closure elements. The clamping frame element with the inserted filter elements is placed in front of the sealing flange of the housing and then pulled toward the sealing flange by successively actuating the clamping closure elements.

To make the clamping closure elements more easily accessible, it is possible to place the clamping frame against a stop edge or individual stop elements in the floor region of the housing and then to apply the biasing force through clamping closure elements that are arranged only in the upper region of the clamping frame or the housing and are therefore freely accessible when the cover is taken off the housing.

Another convenient embodiment of the invention provides a clamping lever arranged in the center, which is pivotably supported on a pin disposed on the floor of the housing adjacent the clamping frame pan and which is formed as a sliding link at its end contacting the clamping frame element, such that the distance of the surface of the sliding link to the pin increases during the closing movement of the clamping lever.

When the unit of clamping frame and filter elements is inserted into the housing, the clamping lever is initially upright to allow an unhindered insertion of the clamping frame. Once the clamping frame and the filters have been placed into their position, the clamping lever is moved toward the floor of the housing. Since the radial distance of the sliding link from the pivot pin continues to increase, the sliding link of the clamping lever contacts the clamping frame element and pushes it onto the sealing flange together with the inserted filter elements. The achievable biasing forces can be influenced through the geometry of the sliding link on the clamping lever.

To prevent the clamping lever from popping up during operation, e.g., as a result of vibrations, hold-down elements are preferably formed on the underside of the cover, which contact the clamping lever once the cover has been mounted or which are arranged to be at least close enough above the clamping lever to prevent it from popping up and thus prevent a loosening of the tight seal.

In a third embodiment, the clamping device is formed by a toggle-type unit. A first and a second toggle are interconnected in an articulated manner and disposed one behind the other perpendicularly to the clamping frame element. The first toggle, which is remote from the clamping frame element, is supported in a fixed bearing on the housing floor. The second toggle has a sliding guide bolt at its end intended for contact with the clamping frame and supported in a sliding guide element functioning as a movable bearing.

Actuation is effected, for example, by means of a handle mounted to one of the toggles in the area of the flexible toggle joint between the toggles. By pressing on the actuating element, the toggles, which are initially at an angle to each other, are increasingly extended, such that the free end of the second toggle presses against the clamping frame element. The additional sliding guide on the movable bearing is provided to define the point of force application of the second toggle.

If the toggle clamps are pressed even further against the housing floor from their extended position, the dead point is overcome and the clamping device self-locks.

In addition to the various embodiments of the clamping device, the cover, beyond its function as a pure complementing element to the housing pan, can also be provided with advantageous features. This includes, for example, support elements contacting the free, non-clamped end of the filter elements. Particularly in interaction with corresponding support elements on the housing floor, the free ends of the filter element are slightly compressed in order to prevent relatively large bending moments at the clamping point when vibrations occur during operation.

In addition to the support elements which engage at specific points and can also assume the function of an end stop for the filter elements, reinforcing ribs may be formed on the underside of the cover, which not only stiffen the cover and can save on material for the cover, but can also support the filter elements inserted into the housing.

A particularly advantageous feature on the cover is a safety element (in the form of control blades) extending conically into the housing pan from the underside of the cover in such a way that the blade contacts the rear of the clamping frame when the filter elements are correctly inserted and clamped. Conversely, this means that the cover cannot be mounted if the clamping frame is incorrectly positioned because the control blades strike against the clamping frame element. When mounting the cover, the operator therefore receives final confirmation that he has correctly inserted and firmly clamped the filter elements. Visual inspection of the seat of the filter elements, which may be difficult due to installation and/or environmental conditions, is therefore replaced or supplemented by a simple additional element.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
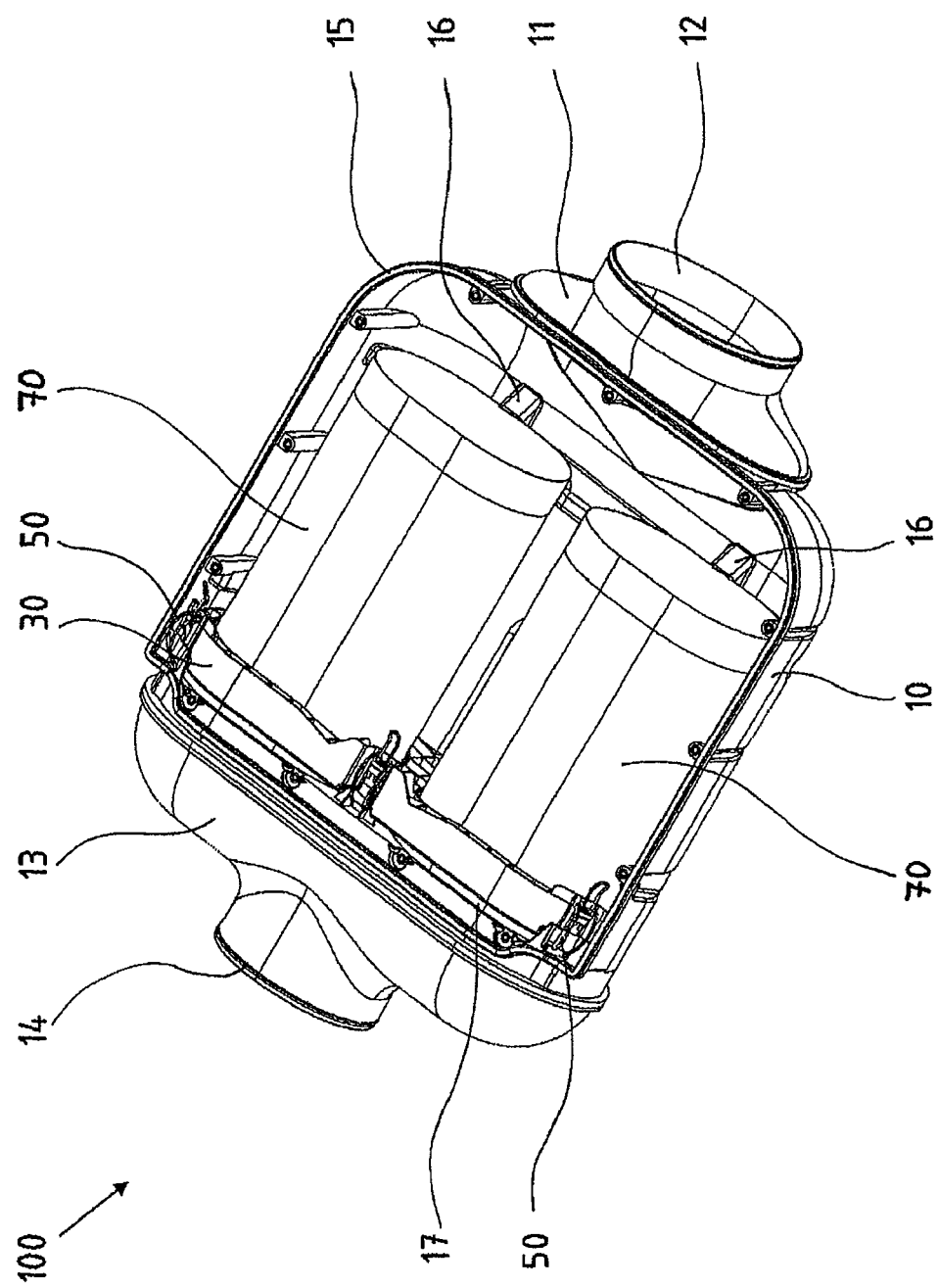
FIG. 1 is a perspective view of a first embodiment of a filter housing according to the invention.

FIG. 1 shows a filter housing 100 comprising a housing pan 10 designed to receive a cover (not shown) along a flange 15. The housing pan 10 tapers to a connection fitting 14 via a funnel region 13 on the filtered air side and to a connection fitting 12 via a funnel region 11 on the unfiltered air side.

Support elements 16 may be seen on the housing floor on which the filter elements 70 rest with their loose unclamped end.

At their other end, the filter elements are inserted into a clamping frame 30 and by this frame are pressed against sealing flanges 17 within the housing. To apply the biasing force, clamping closure elements 50 each are provided on the left, the right and in the center.

Figure 2:
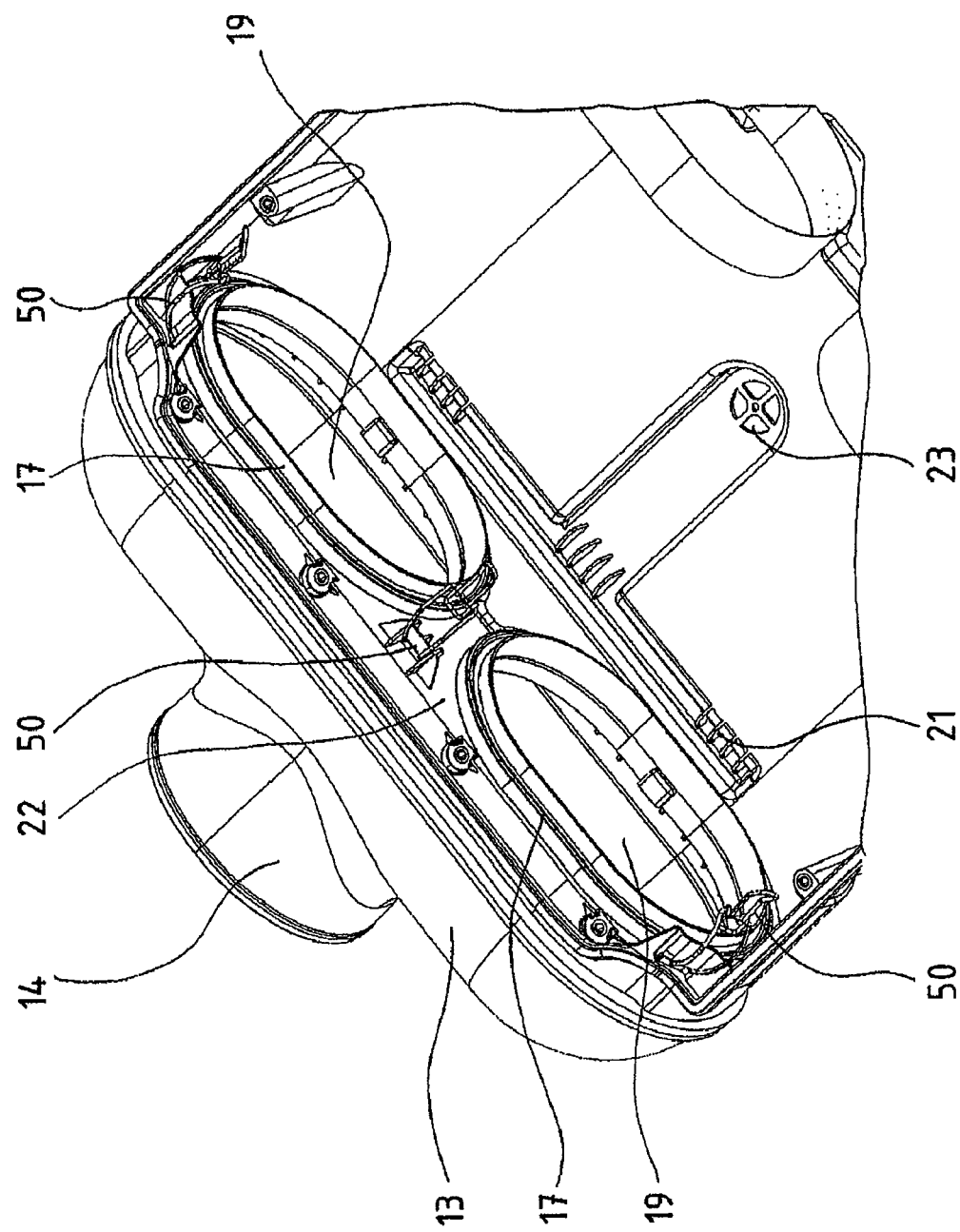
FIG. 2 is a detail view of the filter housing of FIG. 1.

FIG. 2 shows the filtered air side of the filter housing 100 in detail. Here, the filter elements and the clamping frame have been omitted to provide a better view. On the housing floor, profiling may be seen which extends along a groove extending parallel to the sealing flanges 17. This profiling forms a fixed bearing 21 into which the clamping frame element can first be hooked with its underside before being pressed against the flange by means of the clamping closure elements 50 disposed at the top of the sealing flange 17. In this embodiment, a cutout 19 and a sealing flange 17 are formed on a common transverse bulkhead 22 for each filter element. Filtered air is taken in at the fitting 14, is distributed in the funnel region 13 to the two cutouts 19 and then flows through the filter elements, which are not depicted in FIG. 2.

To enable the discharge of any moisture or condensate, a bottom drain 23 is provided in the embodiment depicted here.

Figure 3:
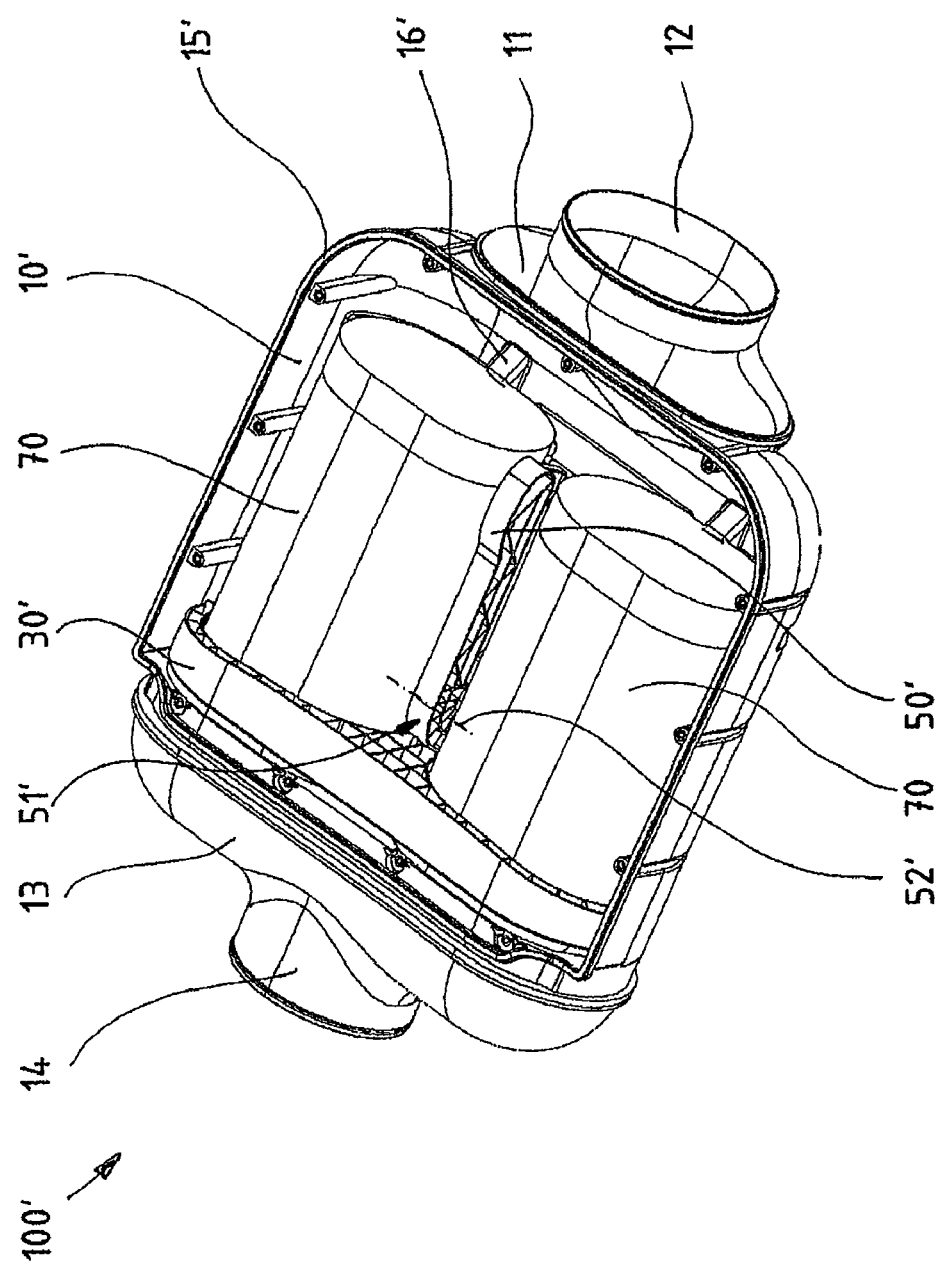
FIG. 3 is a perspective view of a cover for the filter housing of the invention.

FIG. 3 shows another embodiment of the filter housing 100' according to the invention. Here, the housing pan is substantially similar to that of the first embodiment, including the support elements 16' may be seen on the housing floor on which the filter elements 70 rest with their loose unclamped end, similar to support elements 16 of FIG. 1. However, a bearing block is formed on the housing floor to receive a pivot pin 52' supporting a clamping lever 50'. The air filter elements 70 are again seated in a clamping frame element 30', which differs from the clamping frame 30 of the first embodiment only in that it has no bearings for the clamping lever elements. In the clamping frame, the clamping lever 50' is provided with a slide link 51', which is a smooth surface of the upper edge of the clamping lever 50'. The center of the curvature of the slide link is disposed eccentrically to the pivot pin 52' so that, with a pivoting movement, the initially upright clamping lever 50' presses the slide link increasingly toward the clamping frame 30' and through the clamping frame presses the filter elements 70 with their sealing collars against the sealing flange in the housing.

Figure 4:
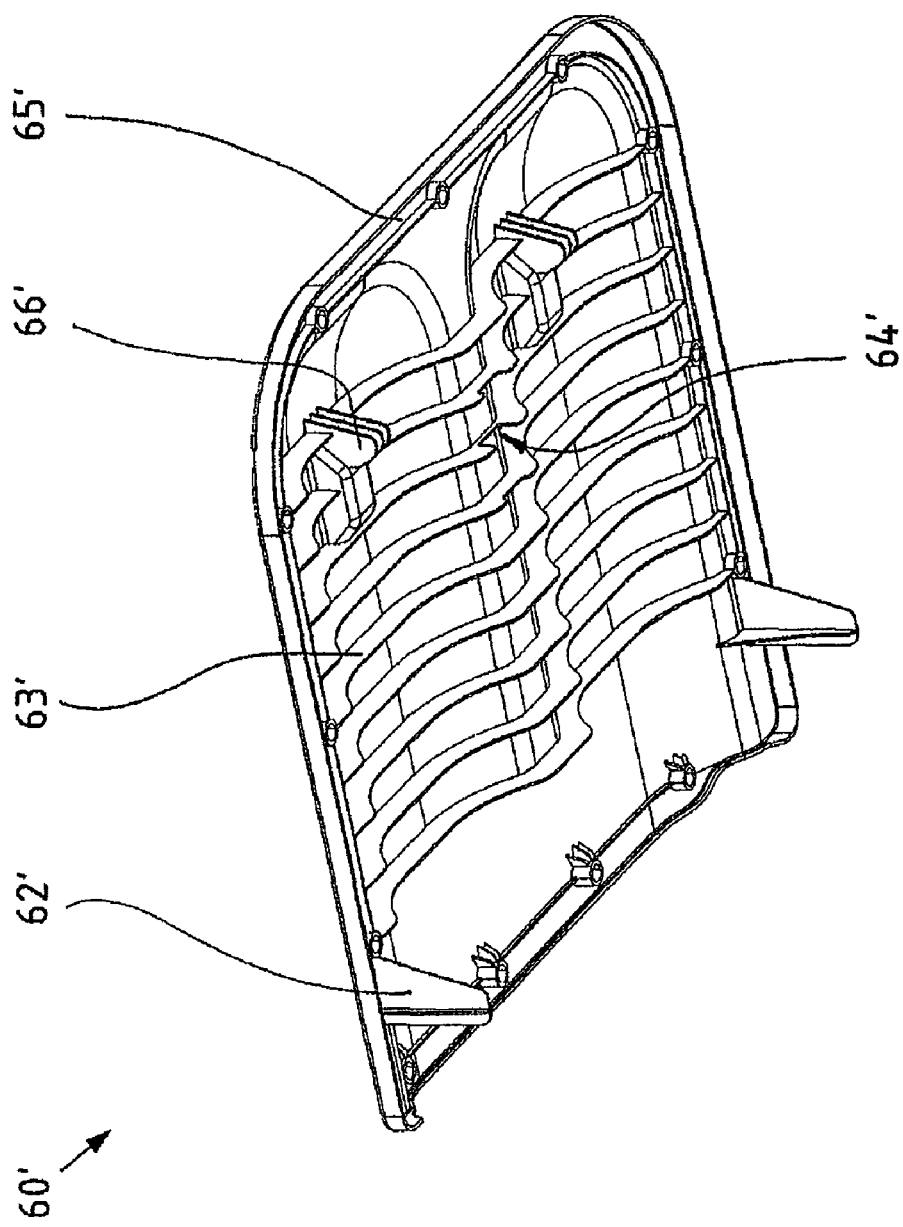
FIG. 4 is a perspective view of a second filter housing embodiment according to the invention.

FIG. 4 shows the matching cover 60' for the second embodiment of a filter housing 100'. The cover 60' has reinforcing ribs 63' on its underside, the contours of which are adapted to the outer contour of the air filter elements 70 and thus support the filter elements to prevent them from beginning to oscillate about their clamping point inside the housing when vibrations occur. A flange 65' is designed to be compatible with flange 15' of the housing pan 10'. Cutouts 64' in some of the ribs 63' serve to receive the thickened handle area of the clamping lever 50' to prevent the clamping lever 50' from popping up once the cover 60' is mounted.

Support elements 66' engage the edge area of the free end of each air filter element 70 from the top as well as laterally and cause a slight compression there.

In addition, the safety element (in the from of control blades 62') is provided, which can be pushed laterally into the gap between the housing wall and the filter elements if the clamping frame 2 is fixed in the proper operating position. If the clamping frame 30' is too far back because no biasing force has been applied, the safety element 62' runs with its transverse ribs against the clamping frame 30' from the top and thereby prevents the cover from being placed correctly at the flanges 65', 15' until the operator establishes the biasing force and thereby brings the clamping frame into its operating position.

Figure 5:
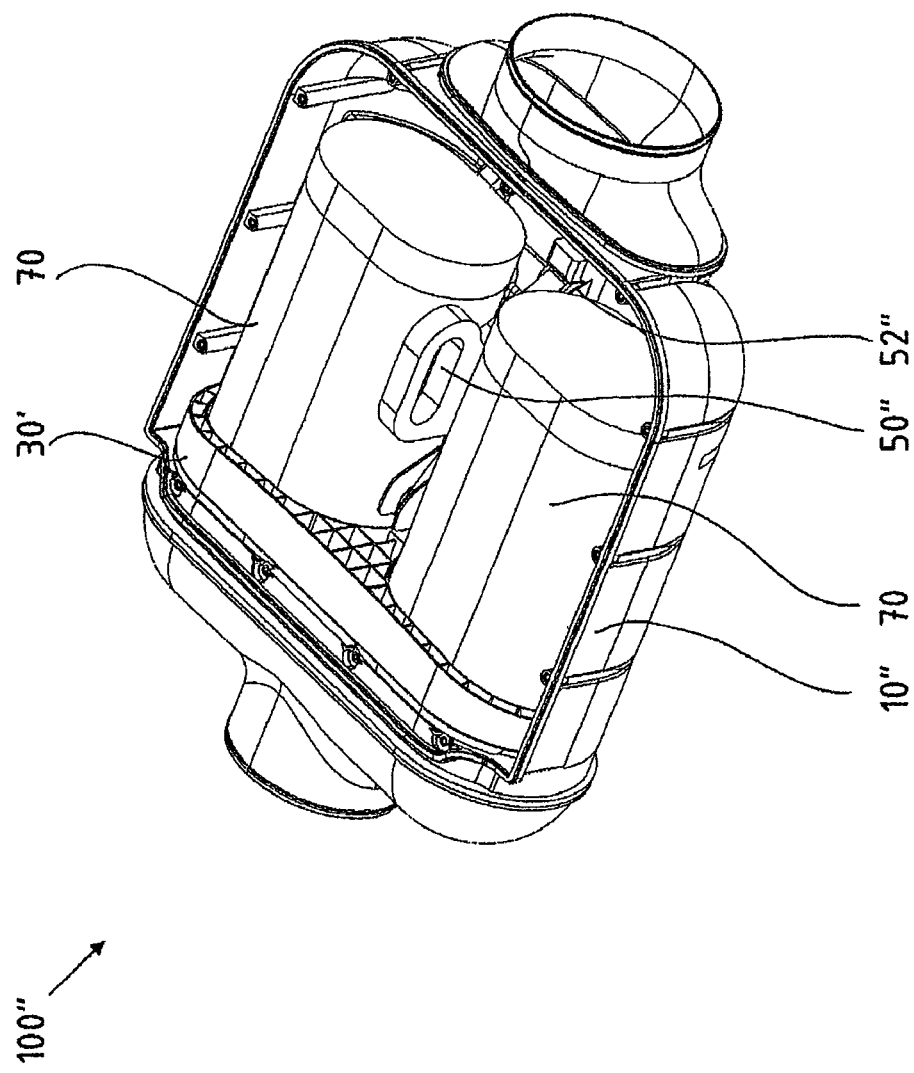
FIG. 5 is a perspective view of a third embodiment of a filter housing according to the invention.

FIG. 5 shows a third embodiment of an inventive filter housing 100". This embodiment again comprises a housing pan 10" with funnel regions 11, 13 which open into connection fittings 12, 14. Two air filter elements 70 are inserted side by side and are connected by a common clamping frame element 30'.

Figure 6:
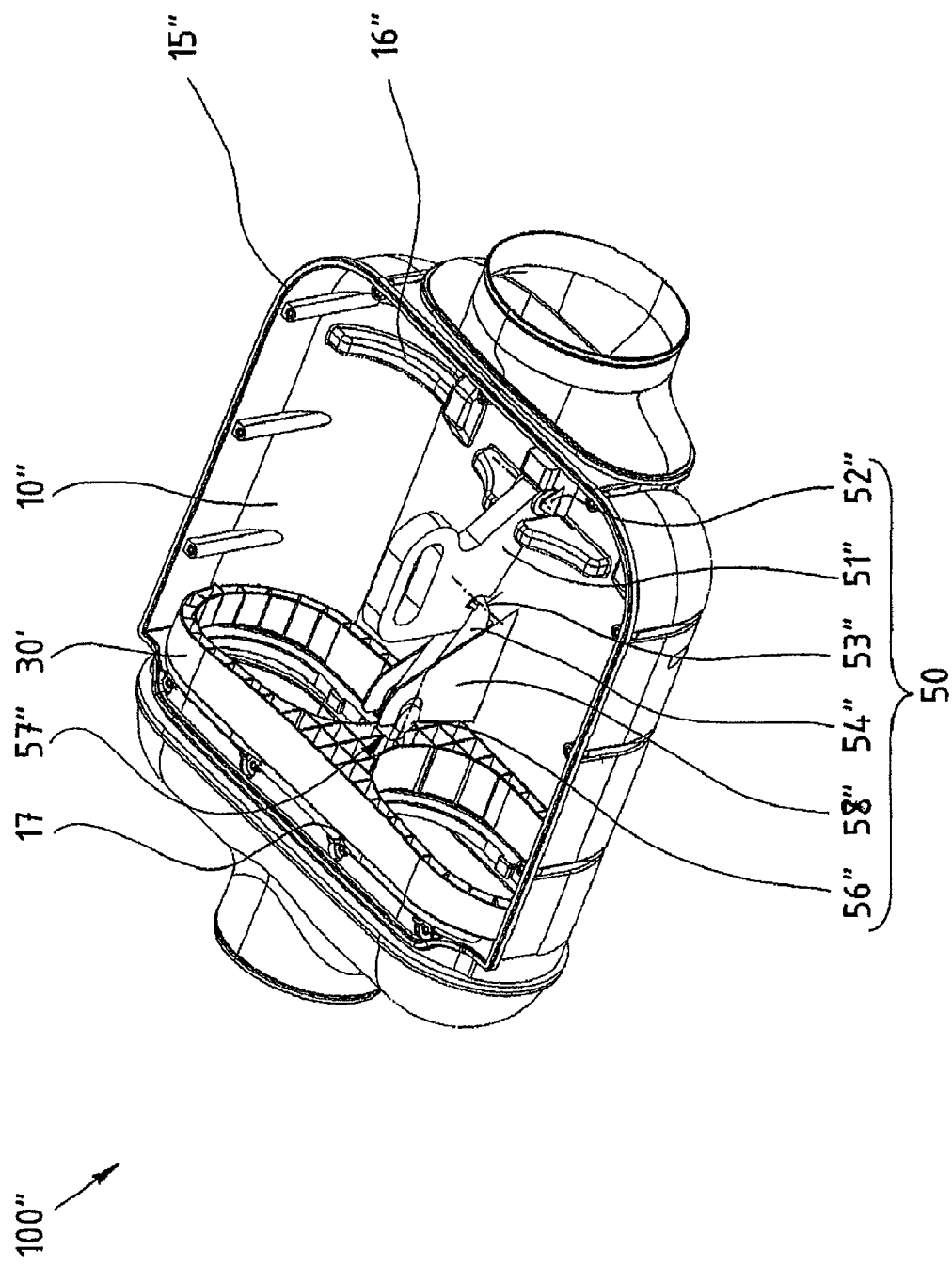
FIG. 6 is a view of the embodiment shown in FIG. 5, but with the filter elements removed.

In this embodiment, the biasing force is again applied at a central application point on the goggle-shaped clamping frame 30'. The clamping device in this case is a toggle unit 50", the construction and operation of which will be explained in greater detail with reference to FIG. 6.

A fixed toggle bearing 52" in which a first toggle 51" is pivotably supported is formed on the housing floor toward the unfiltered air side 12. The first toggle 51" is connected to a second toggle 54' at a toggle joint 53". The second toggle 54" has a sliding guide bolt 56" arranged perpendicularly to its longitudinal extent and with its rounded free end 57" strikes against a central region of the clamping frame element 30'. Near the free end 57" the sliding guide bolt 56" is longitudinally guided in a sliding guide on a movable bearing 58". Because of this guidance and the arrangement of the sliding guide bolt 56" near the free end 57", the end 57" executes a substantially axial movement toward the clamping frame element 30'. In doing so, it drifts slightly in vertical direction.

In horizontal direction it does not drift perpendicularly to the sliding guide because the second toggle 54' is guided between bearing blocks of movable bearing 58", which form the sliding guide. If a handle formed on the first toggle 51" is used to apply a force to the toggle joint 53", the toggles 51", 54" are moved into an extended position, causing the second toggle with its free end 57" to shift the clamping frame element 30' toward the sealing flanges on the transverse bulkhead in the housing. The elevated arrangement of the sliding guide bolt 56" on the movable bearing 58" and the arrangement of the fixed toggle bearing 52" directly on the housing floor enables the toggle joint 53" to be pushed under the imaginary line between the bearing points 52", 56" to overcome the dead point given in the extended position and to bring the toggle unit 50" into a self-locking position, so that there is no risk that the toggles 51", 54" will pop up, not even if the inventive filter housing 100" is subject to relatively large shocks.

In addition, the handle on the first toggle 51" can be positively fixed by means of positive-fit elements formed on the underside of the cover.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter housing, comprising:
    at least one axial flow filter element including an inlet end face and an outlet end face, wherein fluid to be filtered flows axially between said inlet and outlet axial end faces;
    at least one continuous sealing collar circumferentially extending around an outer circumference of said at least one filter element, said sealing collar adapted to press against a sealing flange on the housing;
    a common clamping frame element attached to an interior of said filter housing;
    said common clamping frame element including at least one cutout, each cutout configured to enable insertion of one of said filter element end faces therein; and
    a clamping device provided in said clamping frame;
    wherein individual filter elements of said at least one flow filter element are inserted side by side into said cutouts of said common clamping frame element,
    wherein each of the sealing collars rests on the clamping frame element, and
    wherein the clamping frame element is plane parallel to the at least one sealing flange and can be displaced by a clamping device toward the sealing flange,
    wherein the clamping device is formed by
        a pin disposed adjacent the clamping frame and whose end contacting the clamping frame element is formed as a sliding link;
        a clamping lever pivotably supported on a floor of the housing pan on said pin,
        wherein the distance of the surface of the sliding link to the pin increases during a closing movement of the clamping lever.

2. A filter housing as claimed in claim 1, wherein two filter elements having an oval cross section inserted into a goggle-shaped clamping frame element.

3. A filter housing as claimed in claim 1, wherein the clamping device is formed by a plurality of individually actuatable clamping closure elements.

4. A filter housing as claimed in claim 1, further comprising a water drain in the housing floor.

5. A filter housing as claimed in claim 1, wherein the filter housing comprises a housing pan which tapers to a flow opening in a funnel region on each of two opposite ends and is open on one side in a central area between the funnel regions for removal of the filter element and can be closed by a cover.

6. A filter housing as claimed in claim 5, further comprising:

at least one safety element extending from the underside of the cover and received into a gap between said filter elements a wall of said housing, wherein said safety element is receivable into said gap when said clamping frame is positioned clamping said filter elements to said sealing flange, wherein in said position said at least one safety element presses said clamping frame with said filter elements against said sealing flange.

7. A filter housing as claimed in claim 5, wherein support elements are formed in the housing pan or the housing cover or both the housing pan and housing cover, each of which extends to the outside of a filter element.

8. A filter housing as claimed in claim 1, wherein a transverse bulkhead arranged inside the housing has a cutout for each filter element around which a sealing flange is formed.

9. A filter housing as claimed in claim 8, wherein a separate sealing flange is formed for each of the filter elements.

10. A filter housing as claimed in claim 8, wherein a common sealing flange is formed for all the filter elements.

11. A filter housing, comprising:

at least one axial flow filter element including an inlet end face and an outlet end face, wherein fluid to be filtered flows axially between said inlet and outlet axial end faces;

at least one continuous sealing collar circumferentially extending around an outer circumference of said at least one filter element, said sealing collar adapted to press against a sealing flange on the housing;

a common clamping frame element attached to an interior of said filter housing;

said common clamping frame element including at least one cutout, each cutout configured to enable insertion of one of said filter element end faces therein; and a clamping device provided in said clamping frame;

wherein individual filter elements of said at least one flow filter element are inserted side by side into said cutouts of said common clamping frame element, wherein each of the sealing collars rests on the clamping frame element, and wherein the clamping frame element is plane parallel to the at least one sealing flange and can be displaced by a clamping device toward the sealing flange, wherein the clamping device is formed by a toggle unit comprising:

first and second toggles which are interconnected at a toggle joint, a fixed bearing which connects the first toggle to the floor of the housing, and a moving bearing in which at least one sliding guide bolt disposed on the second toggle is slidingly guided.

\* \* \* \* \*